W. H. BASKIN.
TOOL FOR DEMOUNTABLE RIMS.
APPLICATION FILED SEPT. 23, 1920.
1,396,617.
Patented Nov. 8, 1921.
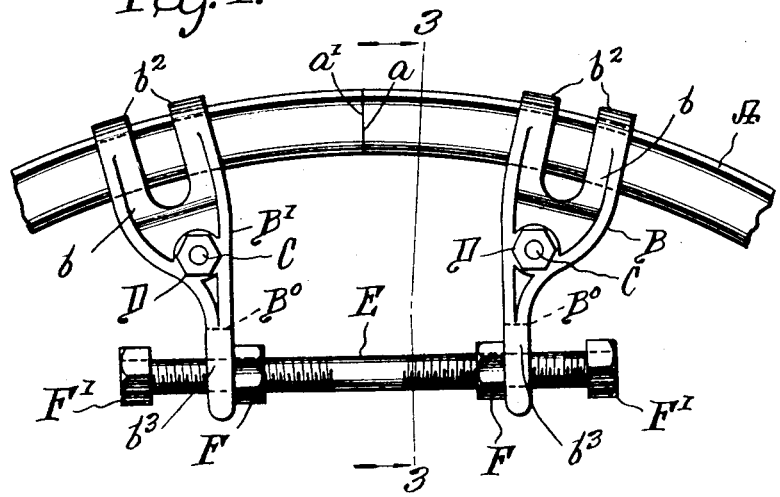
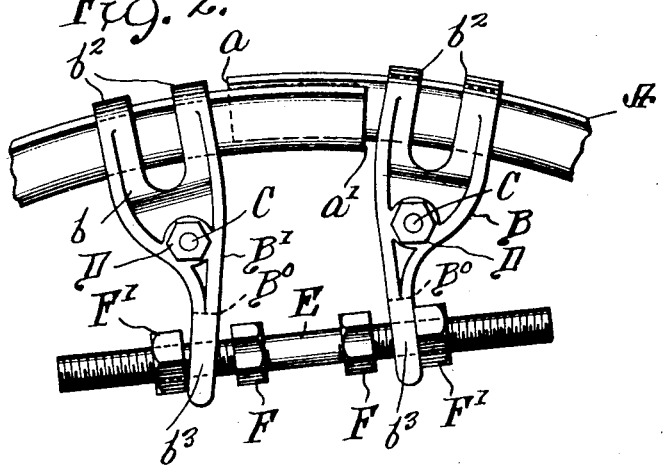
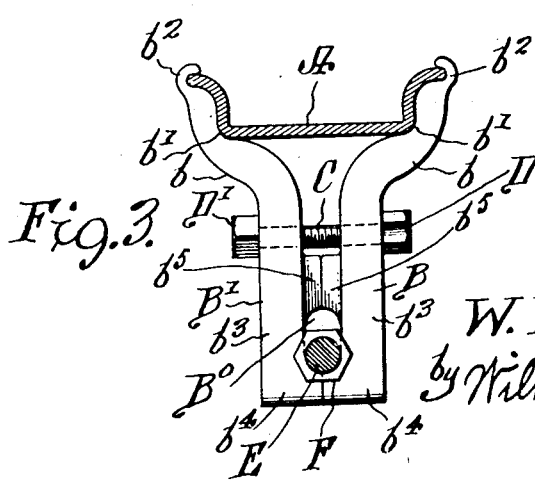
Inventor
W. H. Baskin
by Wilkinson & Giusta,
Attorneys

UNITED STATES PATENT OFFICE.

WILLIAM H. BASKIN, OF MACON, GEORGIA.

TOOL FOR DEMOUNTABLE RIMS.

1,396,617.   Specification of Letters Patent.   Patented Nov. 8, 1921.

Application filed September 23, 1920. Serial No. 412,156.

*To all whom it may concern:*

Be it known that I, WILLIAM H. BASKIN, a citizen of the United States, residing at Macon, in the county of Bibb and State of Georgia, have invented certain new and useful Improvements in Tools for Demountable Rims; and I do hereby declare the following to be a full, clear, and exact description of the invention, such as will enable others skilled in the art to which it appertains to make and use the same.

My invention relates to improvements in tools for demountable rims, and more particularly relates to an improved tool for contracting and expanding the demountable rims of automobile wheels.

The invention is especially intended to provide an inexpensive, durable and efficient device which can be conveniently stored away in the tool chest of an automobile and conveniently and quickly applied to the rim of the tire which is desired to expand or contract as the case may be.

My invention will be more fully understood after reference to the accompanying drawings, in which like parts are indicated by similar reference symbols throughout the several views, and in which:—

Figure 1 is a side elevation of the complete tool as used for expanding the rim of a wheel, the tire and fellies of the wheel being removed for the sake of clearness in the drawing.

Fig. 2 shows a similar view of the device used for holding the rim in the contracted position; and Fig. 3 shows a section along the line 3—3 of Fig. 1, and looking in the direction of the arrows.

A represents the rim of the wheel which may be of any suitable or preferred construction, and provided with the usual brake, the ends of the rim adjacent to said brake being indicated by $a$ and $a'$.

B and B' represent two clamping members which are preferably made as rights and lefts, connected together in pairs, as shown in Figs. 3. Each of these clamping members B and B' is provided with an outwardly flaring end $b$, shaped, as at $b'$ and $b^2$, to fit the tire to be operated on. The opposite ends $b^3$ of these members are provided with abutting lugs $b^4$, and pivot lugs $b^5$ may also be provided, all as shown in Fig. 3.

Between the parts $b^4$ and $b^5$ is an opening $B^0$ when the two members are in the assembled position as shown in Fig. 3. The two members B and B' are secured together in the clamping relation with regard to the rim by means of the bolt C and nuts D and D'. There are preferably two of these nuts so that instead of having a single nut and a solid bolt head the bolt may be set up from either end, thus the two members B and B' may be securely clamped to the rim from either side of the wheel, as shown in Fig. 3.

These clamping members are mounted in pairs as shown in Figs. 1 and 2, and their heels are connected together by the bolt E which passes through the openings $B^0$. This bolt is preferably provided with right and left-handed screw threads, as shown, and may be provided with two sets of nuts F and F', the nuts F being adapted to engage the heels of the clamps and press the same, as shown in Fig. 1, thereby spreading the rim, while the nuts F' may be used to contract the rim and hold it in the contracted position as shown in Fig. 2.

The operation of the device is as follows:—

The parts would ordinarily be loosely held together by the bolt C and nuts D and D' and bolt E and nuts F and F'. By easing up on either of the nuts D or D' the clamps may be put in place, and then set up tight on the rim and then the rim may be expanded by setting up on either of the nuts F, or contracted by moving the nuts F inward and allowing the pressure on the tire to contract the rim, or the rim may be contracted and held in the desired position by setting up on either one or both of the nuts F and F' after the joint of the rim had been broken.

It will be seen that no special tool is required to assemble the parts except an ordinary wrench such as is always found in the tool chest of an automobile as required for other purposes.

It will be noted that the clamps may be cast of malleable metal and roughly made, and that little if any machining is required, the only parts requiring machining being the bolts and nuts and these may be very cheaply made.

It will be noted that the parts are of rugged construction, not likely to get out of repair, and that parts being made ot rights and lefts may be readily replaced when desired.

These and other advantages of the herein described construction would readily suggest themselves to those skilled in the art.

It will be obvious that various modifications might be made in the construction, combination and arrangement of parts could be used without departing from the spirit of my invention; and I do not mean to limit the invention to such details except as particularly pointed out in the claim.

Having thus described my invention what I claim and desire to secure by Letters Patent of the United States is:

A tool of the character described, comprising a pair of clamps, each clamp being formed of a pair of reversely disposed gripping members, each member being flared outward and broadened laterally and bifurcated at its heel, and then curved inward to form a bifurcated gripping claw, the heads of said gripping members being each grooved on the inner side to form a passageway substantially parallel to said claws, and the said members being perforated transversely intermediate of said grooves and said claws, screw bolts passing, respectively, through said perforations in each pair of gripping members, with nuts on said bolts for drawing said jaws together, and a right and left-handed screw having its ends passing said grooves, with nuts on said last mentioned screw, respectively engaging the heads of said clamps, substantially as and for the purpose described.

WM. H. BASKIN.